United States Patent
Morden et al.

(10) Patent No.: US 10,954,991 B2
(45) Date of Patent: Mar. 23, 2021

(54) ELECTROMAGNETIC EFFECT PROTECTIVE FASTENER WITH SWAGEABLE TERMINATION BODY

(71) Applicant: The Boeing Company, Chicago, IL (US)

(72) Inventors: Sean D. Morden, Federal Way, WA (US); Blake A. Simpson, Kent, WA (US); Tanni Sisco, Mukilteo, WA (US); Kwok-Tung Chan, Seattle, WA (US); Monica J. Brockway, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 218 days.

(21) Appl. No.: 15/941,676

(22) Filed: Mar. 30, 2018

(65) Prior Publication Data
US 2019/0301518 A1 Oct. 3, 2019

(51) Int. Cl.
*F16B 19/00* (2006.01)
*F16B 33/06* (2006.01)
(Continued)

(52) U.S. Cl.
CPC ............ *F16B 43/001* (2013.01); *B64D 45/02* (2013.01); *F16B 19/008* (2013.01); *F16B 19/05* (2013.01);
(Continued)

(58) Field of Classification Search
CPC .......... B64D 45/02; F16B 5/02; F16B 5/0258; F16B 19/008; F16B 19/05; F16B 33/004;
(Continued)

(56) References Cited

U.S. PATENT DOCUMENTS

| 2,795,444 A | 6/1957 | Nenzell |
| 2,940,495 A | 6/1960 | Wing |

(Continued)

FOREIGN PATENT DOCUMENTS

| EP | 2871132 A1 | 7/2014 |
| WO | 0201085 A1 | 1/2002 |

OTHER PUBLICATIONS

Search Report for related European Application No. EP19162430.3; report dated Jul. 30, 2019.

*Primary Examiner* — Josh Skroupa
(74) *Attorney, Agent, or Firm* — von Briesen & Roper, s.c.

(57) ABSTRACT

An electromagnetic effect suppressing termination part for a fastener formed of a metallic material, the fastener having a head, a shank, and a male threaded portion opposite the head, has a metallic core coated by a layer of dielectric material. An internal bore of the termination part includes an inner wall, a counterbore hole, and a cavity disposed therebetween. An outer surface includes an outer wall, and a frustoconical wall positioned proximally relative to the outer wall, the frustoconical wall extending radially outwardly from the outer wall and having an included angle of less than approximately 90 degrees. A seal is disposed in the counterbore hole, and the frustoconical wall is configured so that a compressive force applied to the frustoconical wall deforms the inner wall to conform to the male threaded portion of the fastener and deforms the seal to fill the cavity.

20 Claims, 7 Drawing Sheets

(51) Int. Cl.
*F16B 37/08* (2006.01)
*F16B 39/02* (2006.01)
*F16B 43/00* (2006.01)
*B64D 45/02* (2006.01)
*F16B 19/05* (2006.01)
*F16B 33/00* (2006.01)
*F16B 19/04* (2006.01)

(52) U.S. Cl.
CPC ............ *F16B 33/004* (2013.01); *F16B 33/06* (2013.01); *F16B 37/0807* (2013.01); *F16B 39/026* (2013.01); *F16B 2019/045* (2013.01)

(58) Field of Classification Search
CPC .... F16B 33/06; F16B 37/0807; F16B 43/001; F16B 39/026; F16B 2019/045; Y10T 403/47; Y10T 403/471; Y10T 403/472; Y10T 403/75
USPC .............................. 403/265, 266, 267, 408.1
See application file for complete search history.

(56) References Cited

U.S. PATENT DOCUMENTS

| | | | |
|---|---|---|---|
| 3,094,017 A * | 6/1963 | Siebol | F16B 19/05 411/361 |
| 3,170,701 A | 2/1965 | Hoover | |
| 3,464,472 A * | 9/1969 | Reynolds | F16B 19/05 411/336 |
| 3,512,447 A | 5/1970 | Vaughn | |
| 3,520,342 A * | 7/1970 | Scheffer | F16B 33/004 411/303 |
| 4,019,550 A * | 4/1977 | DeHaitre | F16B 33/004 411/303 |
| 4,198,895 A | 4/1980 | Ruhl | |
| 4,630,168 A | 12/1986 | Hunt | |
| 4,701,088 A * | 10/1987 | Crull | F16B 43/001 411/369 |
| 5,018,920 A | 5/1991 | Speakman | |
| 5,156,509 A * | 10/1992 | Wu | F16B 43/001 411/369 |
| 6,283,691 B1 * | 9/2001 | Bogatz | F16B 33/004 411/371.1 |
| 6,665,922 B2 | 12/2003 | Schultz | |
| 7,597,517 B2 * | 10/2009 | Beeles | F16B 19/05 411/361 |
| 7,599,164 B2 | 10/2009 | Heeter et al. | |
| 7,695,226 B2 | 4/2010 | March et al. | |
| 7,755,876 B2 | 7/2010 | Morrill et al. | |
| 8,573,910 B2 | 11/2013 | March et al. | |
| 9,291,187 B2 | 3/2016 | Whitlock et al. | |
| 9,611,052 B2 | 4/2017 | Whitlock et al. | |
| 9,802,715 B2 | 10/2017 | Whitlock et al. | |
| 10,190,619 B2 * | 1/2019 | Goyer | F16B 43/001 |
| 10,428,860 B2 * | 10/2019 | Dobbin | F16B 33/004 |
| 2009/0258220 A1 | 10/2009 | Schaaf et al. | |
| 2010/0270513 A1 | 10/2010 | Haylock et al. | |
| 2010/0272537 A1 | 10/2010 | Haylock et al. | |
| 2010/0278616 A1 | 11/2010 | March et al. | |
| 2013/0259604 A1 * | 10/2013 | Whitlock | F16B 43/001 411/500 |
| 2016/0069380 A1 | 3/2016 | Pinheiro et al. | |

* cited by examiner

ELECTROMAGNETIC EFFECT PROTECTIVE FASTENER WITH SWAGEABLE TERMINATION BODY

FIELD

The present disclosure generally relates to fasteners and, more specifically, to fastener termination parts that provide protection against electromagnetic effects.

BACKGROUND

The use of lightweight composite materials in vehicles, such as aircraft, provide an improved strength-to-weight ratio that translates to fuel savings and lower operational costs. Composite materials, however, do not readily conduct away extreme electrical currents and electromagnetic forces generated by lightning strikes. Furthermore, composite or metallic structures used on vehicles are typically assembled using metallic fastener systems, which are conductive and therefore create electromagnetic effect (EME) design considerations. For example, fastener sparking modes must be designed for lightning conditions that include hot particle ejection and arcing between the fastener and surrounding structures.

SUMMARY

In accordance with one aspect of the present disclosure, an electromagnetic effect suppressing termination part is provided for a fastener formed of a metallic material, the fastener having a head, a shank, and a male threaded portion opposite the head. The termination part includes a metallic core coated by a layer of dielectric material and extends along a longitudinal axis from a proximal end, positioned nearer the head of the fastener, to a distal end opposite the proximal end. An internal bore extends through the termination part and includes an inner wall extending from the distal end, a counterbore hole extending from the proximal end, and a cavity disposed between the inner wall and the counterbore hole. An outer surface includes an outer wall extending from the distal end, and a frustoconical wall positioned proximally relative to the outer wall, the frustoconical wall extending radially outwardly from the outer wall and having an included angle of less than approximately 90 degrees. A seal is disposed in the counterbore hole, and the frustoconical wall is configured so that a compressive force applied to the frustoconical wall deforms the inner wall to conform to the male threaded portion of the fastener and deforms the seal to fill the cavity.

In accordance with another aspect of the present disclosure, a fastener assembly is provided for protection against electromagnetic effects. The fastener assembly includes a fastener formed of a metallic material and having a head, a shank, and a threaded portion opposite the head. The assembly further includes a termination part formed of a metallic core coated by a layer of dielectric material, the termination part having an internal bore extending through the termination part along a longitudinal axis from a proximal end of the termination part, positioned nearer the head of the fastener, to a distal end of the termination part, positioned opposite the proximal end, the internal bore including an inner wall extending from the distal end, a counterbore hole extending from the proximal end, and an annular cavity disposed between the inner wall and the counterbore hole. An outer surface of the termination part includes an outer wall extending from the distal end, and a frustoconical wall positioned proximally relative to the outer wall, the frustoconical wall extending radially outwardly from the outer wall and having an included angle of less than approximately 90 degrees. A seal is disposed in the counterbore hole, and the frustoconical wall is configured so that a compressive force applied to the frustoconical wall deforms the inner wall to conform to the threaded portion of the fastener and deforms the seal to fill the cavity.

In accordance with a further aspect of the present disclosure, a method of fastening a structural assembly to suppress electromagnetic effects includes providing a fastener formed of a metallic material and having a threaded portion opposite a head, positioning a termination part over the fastener so that an inner wall of an internal bore of the termination part overlies the threaded portion of the fastener, wherein the termination part has a metallic core coated by a layer of dielectric material, and the termination part extends along a central axis from a proximal end, positioned nearer the head of the fastener, to a distal end opposite the proximal end, and applying compressive force to a frustoconical wall formed in an outer surface of the body until the inner wall deforms radially inwardly to conform to and mechanically interlock with the threaded portion of the fastener In another aspect of the disclosure that may be combined with any of these aspects, the inner wall has a smooth surface.

In another aspect of the disclosure that may be combined with any of these aspects, the inner wall of the internal bore has a cylindrical shape and is sized to form a clearance fit with the male threaded portion of the fastener.

In another aspect of the disclosure that may be combined with any of these aspects, the termination part has a body length from the proximal end to the distal end, and in which the outer wall of the outer surface has an outer wall length that is up to approximately 60% of the body length.

In another aspect of the disclosure that may be combined with any of these aspects, the core of the termination part is formed of a core material having an associated ultimate tensile strength, and in which the termination part is configured to deform at a compressive load of approximately 25-75% of the ultimate tensile strength.

In another aspect of the disclosure that may be combined with any of these aspects, the assembly further includes a first structural member having a first through hole, and a second structural member having a second through hole aligned with the first through hole, wherein the fastener is positioned so that the shank of the fastener extends through the first and second through holes.

In another aspect of the disclosure that may be combined with any of these aspects, each of the first and second structural members is formed of a metallic material.

The features that have been discussed can be achieved independently in various embodiments or may be combined in yet other embodiments, further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The embodiments disclosed herein provide apparatus and systems for terminating fasteners in a manner that protects against EME. A termination part for a fastener has a metallic core coated by a layer of dielectric material. An inner surface of the termination part includes an inner cylindrical wall sized to slidably receive a threaded portion of the fastener, and an outer surface including a frustoconical portion. A seal is disposed in a counterbore hole formed in the inner surface of the termination body. A compressive force applied to the frustoconical wall deforms the inner cylindrical wall to conform to the threaded portion of the fastener, thereby terminating the fastener. Additionally, the force deforms the seal so that it fills the cavity. Accordingly, the coating layer of dielectric on the termination part protects against EME generated between a distal end of the termination part and the fastener, while the deformed seal occupies the cavity to protect against EME developing between a proximal end of the termination part and the fastener.

Figure 1:
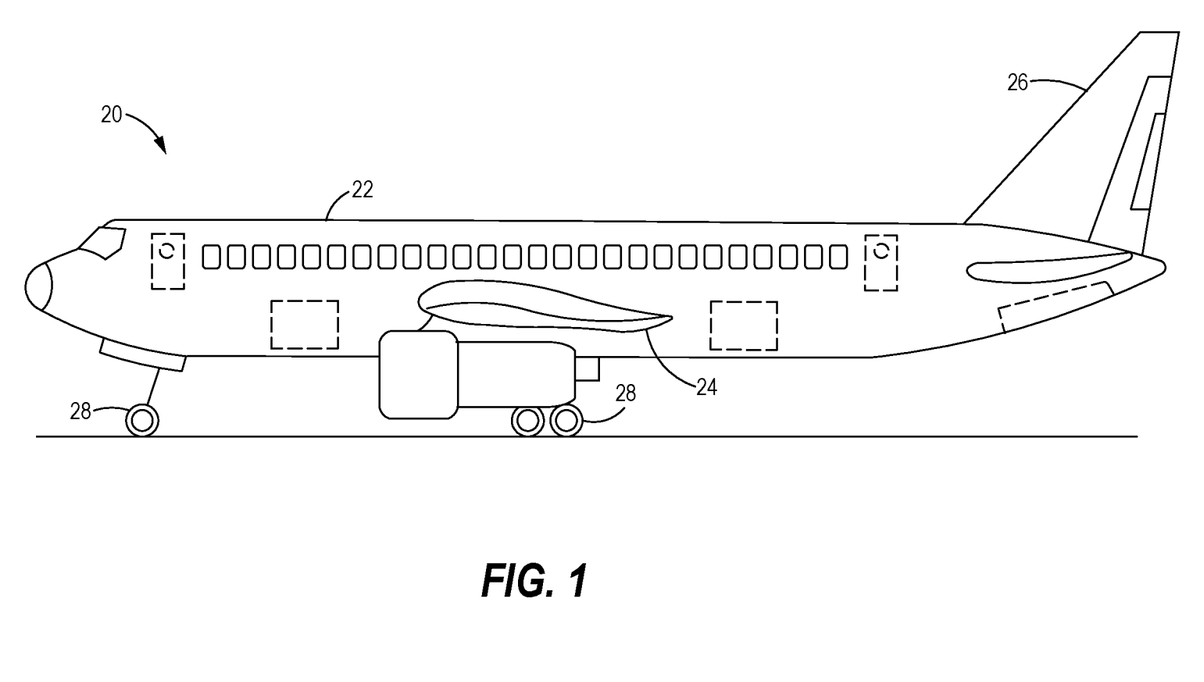
FIG. 1 is a schematic illustration of an aircraft.

Referring to FIG. 1, the embodiments disclosed herein may be described in the context of aircraft assembly. An aircraft 20 may include a fuselage 22, wing assemblies 24, empennage 26, and landing gear assemblies 28. For an aircraft of this type, a large number of fastener assemblies— in some cases on the order of one million assemblies—may be used to fasten together the various components and sub-components. EME protection is desirable in certain locations on the aircraft 20. For example, EME protection is desirable for wing assemblies 24 and other structures. To provide EME protection, the wing assemblies 24 may be assembled with as many as 20,000 fasteners.

An exemplary fastener assembly 30 that protects against EME is illustrated at FIGS. 2-6. As shown, the fastener assembly 30 is used to assemble a first structural member 32 to a second structural member 34. The first and second structural members 32, 34 may be provided with components or sub-components, such as the wing assemblies 24, provided on the aircraft 20. In the illustrated embodiment, the first structural member 32 has a first through hole 36, while the second structural member 34 has a second through hole 38. As shown, the second through hole 38 is aligned with the first through hole 36. In some embodiments, each of the first and second structural members 32, 34 is formed of a composite material, and the fastener is formed of a metallic material. In other embodiments, each of the first and second structural members 32, 34 is formed of a metallic material, while in still other embodiments one of the first and second structural members 32, 34 is formed of a metallic material while the other of the first and second structural members 32, 34 is formed of a composite material. While, in the illustrated embodiments, the fastener assembly 30 is shown assembling two structural components, it will be appreciated that the fastener assembly 30 may be used with a single structural member, more than two structural members, or provided separately on its own.

Figure 2:
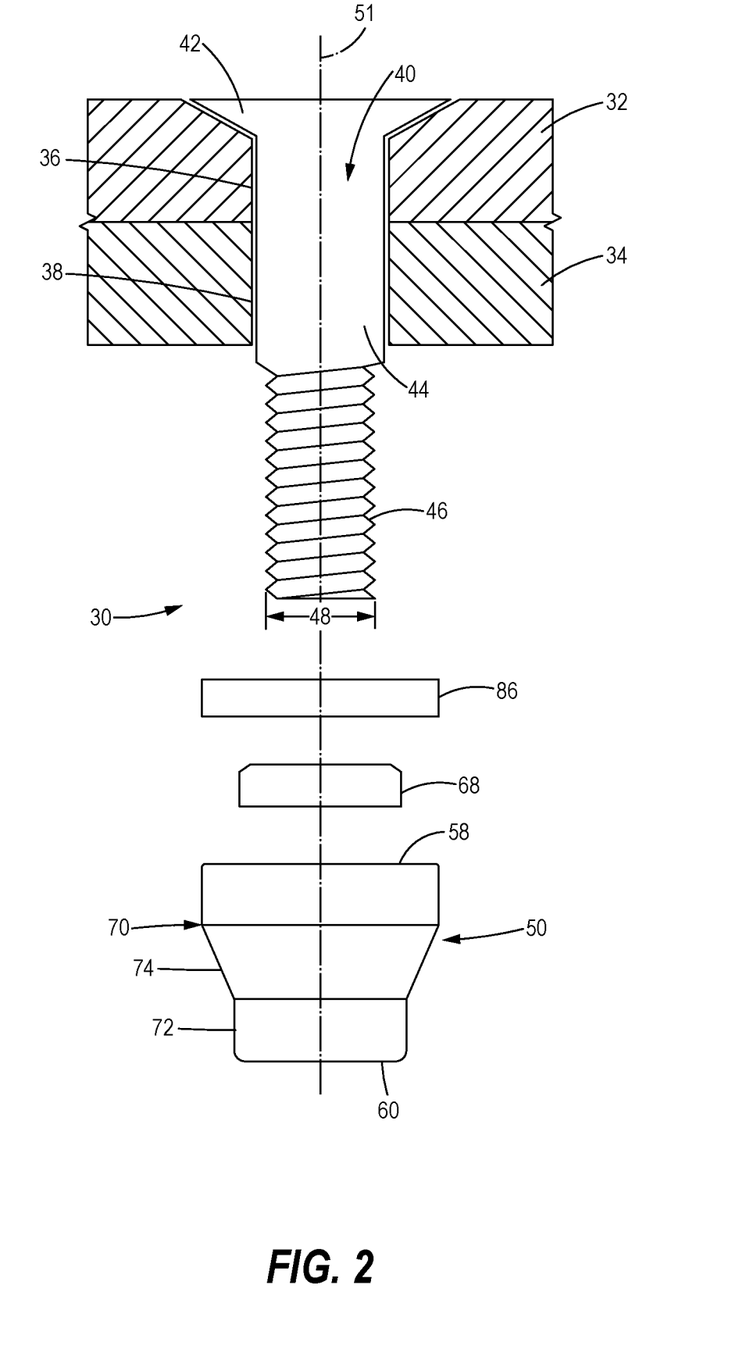
FIG. 2 is an exploded perspective view, partially in cross-section, of an EME protective fastener system with swageable termination part, in accordance with the present disclosure.
Figure 3:
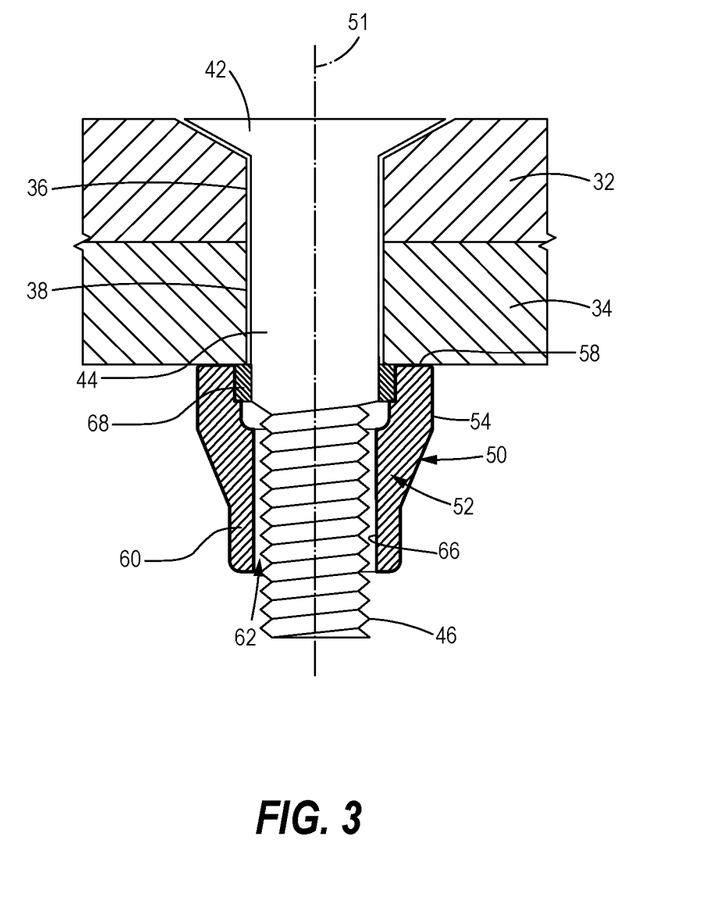
FIG. 3 is a side elevation view, in partial cross-section, of the EME protective fastener system of FIG. 2, with the swageable termination part in position relative to the fastener prior to swaging.
Figure 4:
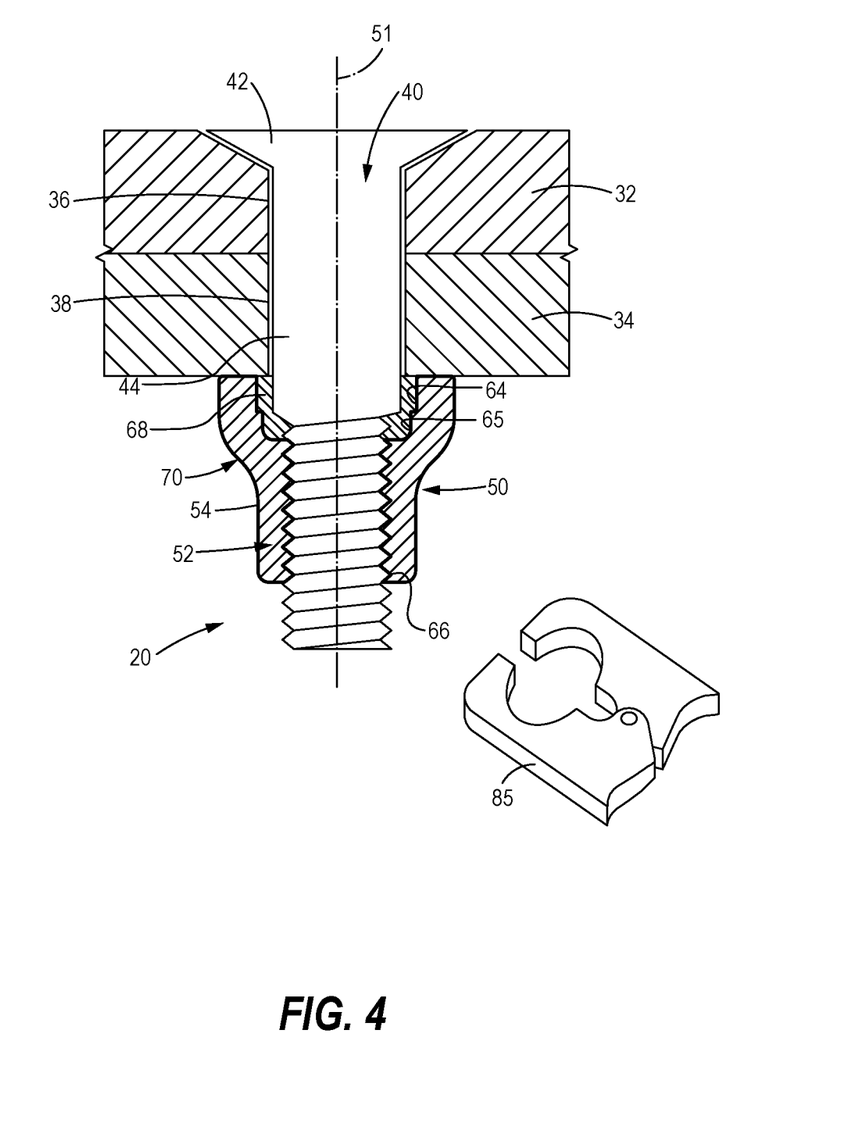
FIG. 4 is a side elevation view, in partial cross-section, of the EME protective fastener system of FIG. 2, with the swageable termination part in position relative to the fastener after swaging.

A fastener 40 formed of metallic material is provided to fasten together the first and second structural members 32, 34. As best shown in FIGS. 2-4, the fastener 40 includes a head 42, a shank 44, and a male threaded portion 46 provided opposite the head 42. The shank 44 is sized for slidable insertion through the first and second through holes 36, 38 of the first and second structural members 32, 34, respectively. The male threaded portion 46 may define a male thread major diameter 48.

A termination part 50 is provided for terminating the fastener 40, so that the fastener assembly 30 securely fastens the first and second structural members 32, 34, as best shown in FIGS. 2-4. The termination part 50 has a core 52 formed of metallic material to provide sufficient strength. As particularly shown in FIGS. 3, 4, and 6, the metallic core 52 is coated by a layer 54 of dielectric material (illustrated in the figures with a relatively thicker line tracing a periphery of the termination part 50) to block the electrical bonding path between the fastener 40 and the termination part 50. The dielectric material may be any material that exhibits dielectric properties, such as thermosets, thermoplastics, rubber, ceramics, and elastomers.

With reference to FIGS. 2-6, the termination part 50 extends along a longitudinal axis 51 from a proximal end 58, nearer the head 42 of the fastener 40 and facing the second structural member 34, to a distal end 60 opposite the proximal end 58. An internal bore 62 formed through the termination part 50 includes a counterbore hole 64 at the proximal end 58, and an inner wall 66 formed at the distal end 60. The internal bore 62 further includes a cavity 65 disposed between the counterbore hole 64 and the inner cylindrical wall 66.

Figure 6:
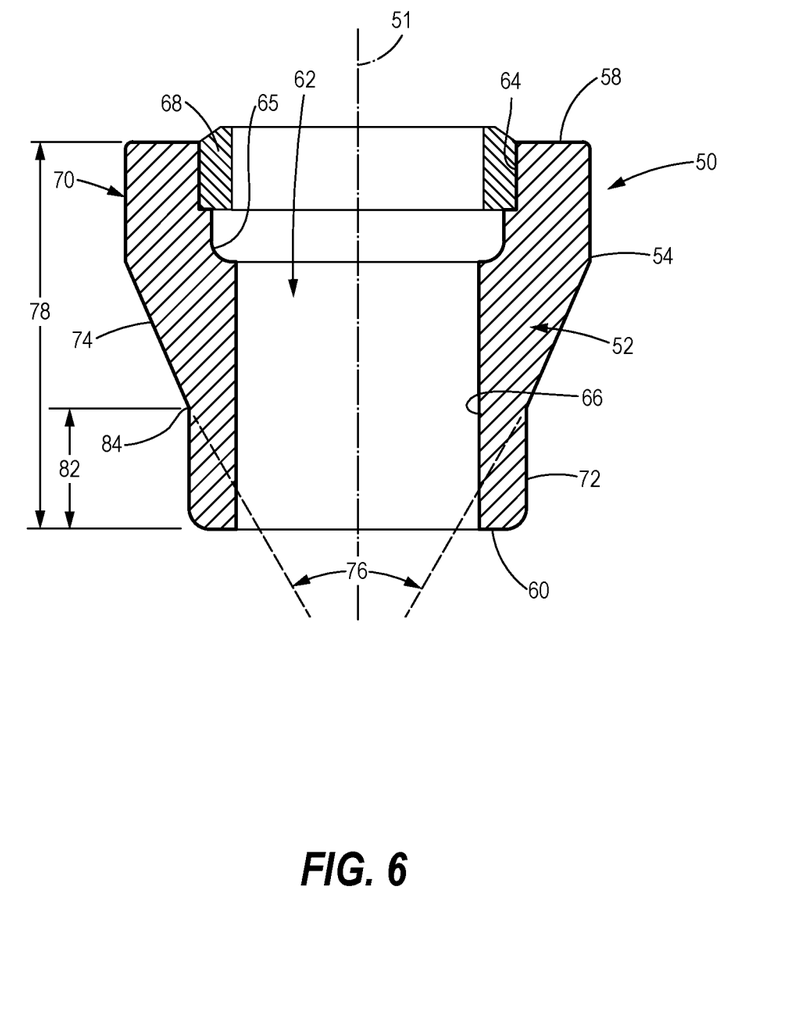
FIG. 6 is a side elevation view, in cross-section, of the termination part shown in FIG. 5.

As best shown in FIG. 6, the cavity 65 may have an annular shape. Furthermore, the inner wall 66 may have a cylindrical shape sized to form a clearance fit with the male threaded portion 46 of the fastener 40. As used herein, a "clearance fit" means that the diameter of the inner wall 66 is larger than the male major thread diameter 48, so that the inner wall 66 of the termination part 50 may slide over the male threaded portion 46 of the fastener 40. Accordingly, when a clearance fit between the inner wall 66 and the male threaded portion 46 of the fastener 40 is used, the termination part 50 is not threaded onto the fastener 50, but is slid into position over the fastener 40. Each of the counterbore hole 64, annular cavity 65, and inner cylindrical wall 66 may be concentric with the longitudinal axis 51. Additionally, a seal 68, which may also have an annular shape, is sized for insertion into the counterbore hole 64 and is formed of a dielectric material, such as a polymeric material.

Figure 5:
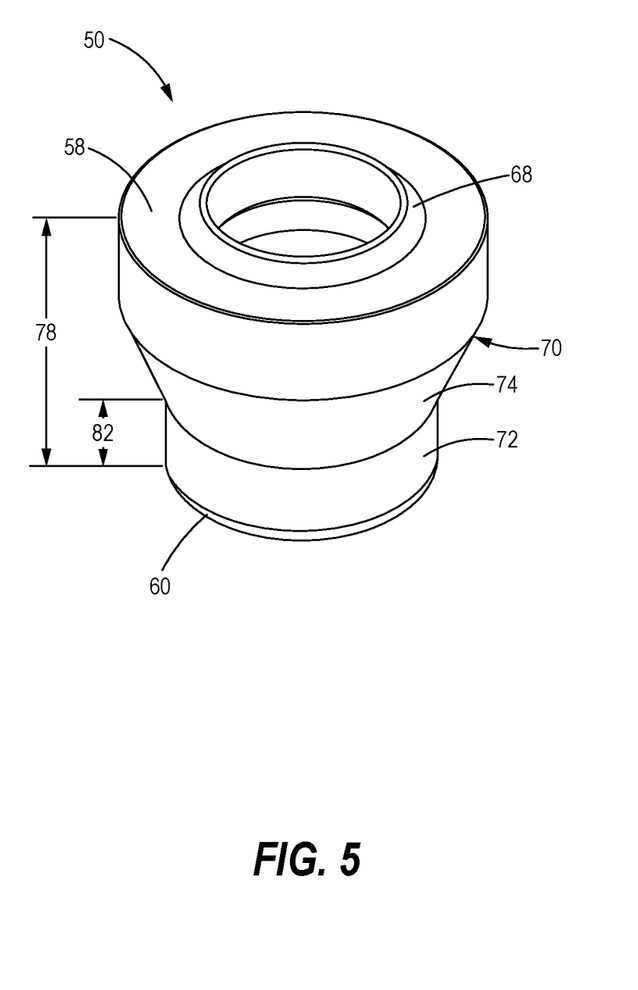
FIG. 5 is a perspective view of a termination part for use in the EME protective fastener system of FIG. 2.

The termination part 50 further includes an outer surface 70 configured to facilitate swaging of the termination part 50 onto the fastener 40. As best shown in FIGS. 5 and 6, the outer surface 70 includes an outer wall 72, which may have a cylindrical shape and may be concentric with the longitudinal axis 51, extending from the distal end 60 of the termination part 50, and a frustoconical wall 74 positioned proximally relative to the outer wall 72. The frustoconical wall 74 extends radially outwardly from the outer wall 72 and defines an included angle 76 (FIG. 6). The included angle 76 is selected to facilitate radially inward deformation of the termination part 50 during swaging. In some embodiments, for example, the included angle 76 may be less than approximately 90 degrees.

The termination part 50 may have additional characteristics that facilitate swaging with the fastener 40. For example, the location of the frustoconical wall 74 may be selected to promote deformation of desired portions of the termination part 50. The location of the frustoconical wall is defined herein with reference to a relative length of the outer wall 72 to an overall body length 78 of the termination part 50. More specifically, the termination part 50 may have a body length 78 from the proximal end 58 to the distal end 60. The outer wall 72 may have an outer wall length 82 extending from the distal end 60 to a termination point 84 of the outer wall 72, where the outer surface 70 transitions from the outer wall 72 to the frustoconical wall 74. Accordingly, the outer wall length 82 may be characterized quantified with reference to the body length 78 of the termination part 50, and will determine the relative location of the frustoconical wall 74. In some embodiments, the outer wall length 82 is up to approximately 60% of the body length 78, thereby to place the frustoconical wall 74 in the desired location to promote swaging with the fastener 40.

Additionally, the core 52 of the termination part 50 may be formed of a material that promotes deformation of the termination part 50 during swaging, while having sufficient strength to securely couple the termination part 50 with the fastener 40. For example, the core material may have an associated ultimate tensile strength (UTS), which is defined herein as the maximum stress that a material can withstand while being stretched or pulled before breaking. In some embodiments, the core material is selected so that it deforms at a compressive load of approximately 25-75% of the UTS of the core material. Materials exhibiting deformation at the desired loads include, but are not limited to, aluminum, steel, and titanium.

When a radially inwardly directed compressive load is applied to the outer surface 70 of the termination part 50, the internal bore 52 deforms to suppress EME. FIG. 3 illustrates the fastener assembly 30 prior to applying the compressive load. In this pre-deformation state, the inner wall 66 of the termination part 50 is relatively smooth and sized to permit sliding over the male threaded portion 46 of the fastener 40. Additionally, the counterbore hole 64 and cavity 65 are configured such that the seal 68 is disposed within only the counterbore hole 64 and not the cavity 65.

FIG. 4 illustrates the fastener assembly 30 after the compressive load has been applied. The compressive load may be provided by, for example, a swage tool 85. In the post-deformation state, the inner wall 66 has deformed radially inwardly so that it conforms to and mechanically interlocks with the male threaded portion 46 of the fastener. Additionally, the counterbore hole 64 deforms radially inwardly to compress the seal 68 against the fastener 40, causing the seal 68 to fill the cavity 65. In this manner, the coating layer 54 of dielectric on the termination part 50 protects against EME generated between the distal end 60 of the termination part 50 and the fastener 40. Additionally, the deformed seal 68 occupies the cavity 65 to protect against EME generating between the proximal end 58 of the termination part 50 and the fastener 40. Still further, by using a compressive load applied to outer surface 70 of the termination part 50 instead of threading the termination part 50 onto the fastener 40, any possible scuffing of the coating layer 54 which would expose the core 52 is limited to the outer surface 70 of the termination part 50, thereby mitigating an additional possible source of EME.

Optionally, the fastener assembly 30 may further include a washer 86. The washer 86 may be disposed between the proximal end 58 of the termination part 50 and the second structural member 34. The optional washer 86 is shown in FIG. 2, but has been omitted from the other drawings for clarity.

While a fastener assembly 30 is described above as having the fastener 40 and the termination part 50 to secure together first and second structural members 32, 34, it will be appreciated that the termination part 50 may be used with a single structural member, more than two structural members, or provided individually for use with an existing fastener and/or structural members.

Figure 7:
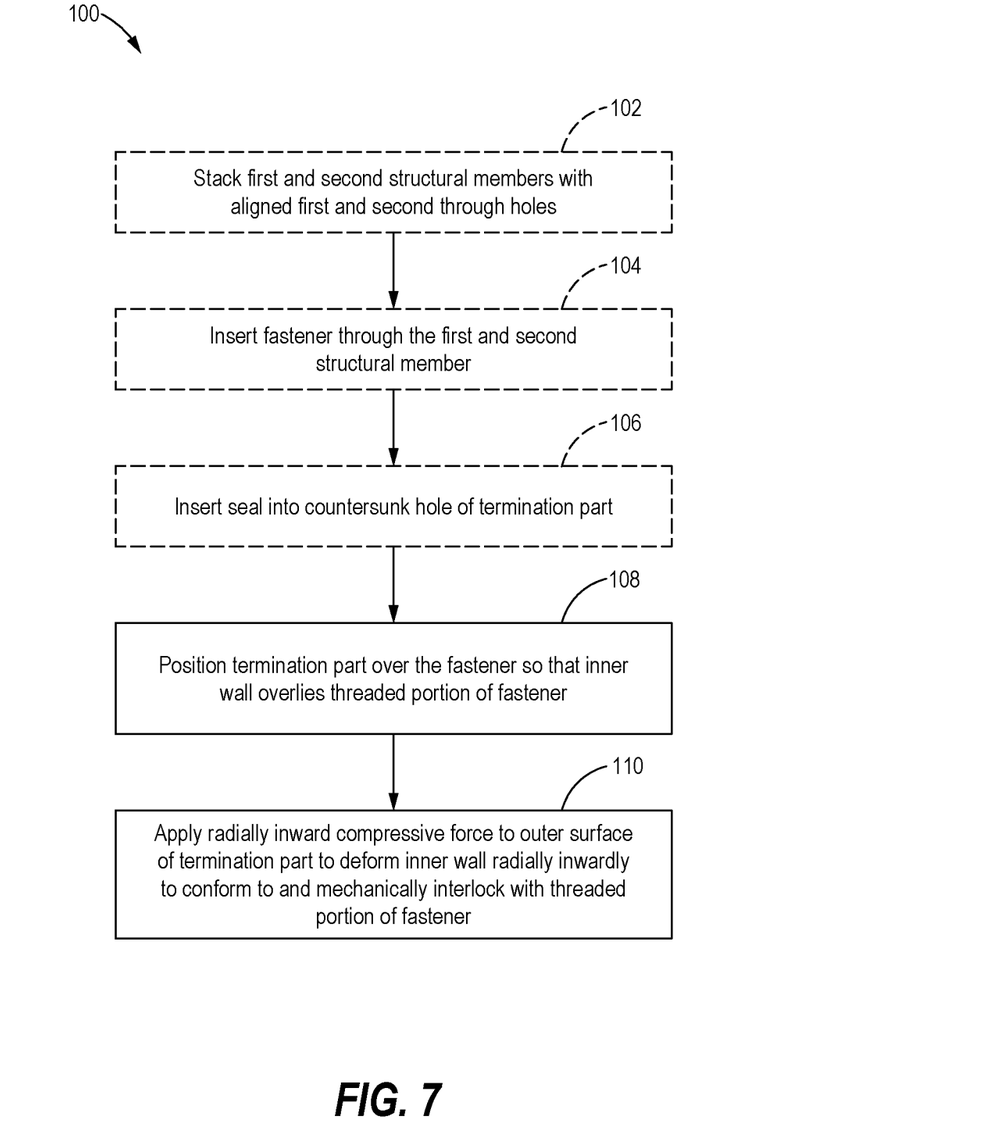
FIG. 7 is a block diagram illustrating a method of terminating a fastener with a termination body to suppress EME, in accordance with the present disclosure.

FIG. 7 shows a block diagram of a method 100 of fastening a structural assembly while suppressing electromagnetic effects. The steps of the method may be performed in other sequences than the particular sequence shown, and the particular sequence shown by the block diagram is representative.

The method 100 begins optionally at block 102, where first and second structural members 32, 34 are stacked so that a first through hole 36 of the first structural member is aligned with a second through hole 38 of the second structural member 34. The method 100 may continue optionally at block 104, where a fastener 40 is inserted through the first and second structural members 32, 34. In this step, the fastener 40 may be positioned so that a shank 44 of the fastener 40 extends through the first and second through holes 36, 38, and a threaded portion 46 of the fastener 40 is exposed.

At block 106, the method 100 includes inserting a seal 68 into a counterbore hole 64 formed in an internal bore 62 of a termination part 50. At block 108, the method 100 continues by positioning the termination part 50, with attached seal 68, over the fastener 40. The termination part 50 may include an internal bore 62 having an inner wall 66 that overlies the threaded portion 46 of the fastener 40. The termination part 50 may have a metallic core 52 coated by a layer 54 of dielectric material, and may extend along a longitudinal axis 51 from a proximal end 58 to a distal end 60.

The method 100 continues at block 110, where a compressive force is applied to an outer surface 70 of the termination part 50. Specifically, a radially inwardly directed force may be applied to a frustoconical wall 74 of the outer surface 70 until the inner wall 66 deforms radially inwardly to conform to and mechanically interlock with the male threaded portion 46 of the fastener 40. The compressive force may further deform the counterbore hole 64 in a radially inward direction to compress the seal 68 against the fastener 40 and into a cavity 65 provided in the internal bore 62 between the counterbore hole 64 and the inner wall 66.

The method 100 protects against EME by ensuring that the coating layer 54 of dielectric on the termination part 50 protects against EME generated between the distal end 60 of the termination part 50 and the fastener 40, while the deformed seal 68 occupies the cavity 65 to protect against EME generating between the proximal end 58 of the termination part 50 and the fastener 40. The method 100 reduces inadvertent removal of the coating layer 54 from the inner wall 66 by coupling the termination part 50 to the fastener 40 using swaging instead of a threaded connection, which introduces friction between the components that may remove the coating layer 54.

Although described in terms of specific structures and components, other configurations and/or other components may be utilized, potentially in other environments. Moreover, although the disclosure presents structures in only shapes and sizes depicted, numerous variations of disclosed structures may be envisioned for use in alternative embodiments, as may be appreciated by those skilled in the art.

What is claimed is:

1. An electromagnetic effect suppressing termination part for a fastener formed of a metallic material, the fastener having a head, a shank, and a male threaded portion opposite the head, the termination part comprising:
   a metallic core coated by a layer of dielectric material, the termination part extending along a longitudinal axis from a proximal end, to a distal end opposite the proximal end;
   an internal bore extending through the termination part and including an inner wall extending from the distal end, a counterbore hole extending from the proximal end, and a cavity disposed between the inner wall and the counterbore hole;
   an outer surface including an outer wall extending from the distal end, and a frustoconical wall positioned proximally relative to the outer wall, the frustoconical wall extending radially outwardly from the outer wall and having an included angle of less than approximately 90 degrees; and
   a seal disposed in the counterbore hole;
   wherein the frustoconical wall is configured so that a compressive force applied to the frustoconical wall deforms the inner wall radially inward into the internal bore and deforms the seal to fill the cavity.

2. The termination part of claim 1, in which the inner wall has an unthreaded surface.

3. The termination part of claim 1, in which the inner wall of the internal bore has a cylindrical shape and is sized to form a clearance fit with the male threaded portion of the fastener.

4. The termination part of claim 1, in which the termination part has a body length from the proximal end to the distal end, and in which the outer wall of the outer surface has an outer wall length that is up to approximately 60% of the body length.

5. The termination part of claim 1, in which the core of the termination part is formed of a core material having an associated ultimate tensile strength, and in which the termination part is configured to deform at a compressive load of approximately 25-75% of the ultimate tensile strength.

6. A fastener assembly for protection against electromagnetic effects, the fastener assembly comprising:
   a fastener formed of a metallic material and having a head, a shank, and a threaded portion opposite the head;
   a termination part formed of a metallic core coated by a layer of dielectric material, the termination part including:
      an internal bore extending through the termination part along a longitudinal axis from a proximal end of the termination part, positioned nearer the head of the fastener, to a distal end of the termination part, positioned opposite the proximal end, the internal bore including an inner wall extending from the distal end, a counterbore hole extending from the proximal end, and an annular cavity disposed between the inner wall and the counterbore hole; and
      an outer surface including an outer wall extending from the distal end, and a frustoconical wall positioned proximally relative to the outer wall, the frustoconical wall extending radially outwardly from the outer wall and having an included angle of less than approximately 90 degrees; and
   a seal disposed in the counterbore hole;
   wherein the frustoconical wall is configured so that a compressive force applied to the frustoconical wall deforms the inner wall to conform to the threaded portion of the fastener and deforms the seal to fill the cavity.

7. The fastener assembly of claim 6, in which the inner wall has an unthreaded surface.

8. The fastener assembly of claim 6, in which the inner wall of the internal bore has a cylindrical shape and is sized to form a clearance fit with the male threaded portion of the fastener.

9. The fastener assembly of claim 6, in which the termination part has a body length from the proximal end to the distal end, and in which the outer wall of the outer surface has an outer wall length that is up to approximately 60% of the body length.

10. The fastener assembly of claim 6, in which the core of the termination part is formed of a core material having an associated ultimate tensile strength, and in which the termination part is configured to deform at a compressive load of approximately 25-75% of the ultimate tensile strength.

11. The fastener assembly of claim 6, further comprising:
    a first structural member having a first through hole; and
    a second structural member having a second through hole aligned with the first through hole;
    wherein the fastener is positioned so that the shank of the fastener extends through the first and second through holes.

12. The fastener assembly of claim 11, in which each of the first and second structural members is formed of a metallic material.

13. A method of fastening a structural assembly to suppress electromagnetic effects, the method comprising:
    providing a fastener formed of a metallic material and having a head, a shank, and a threaded portion opposite the head;
    providing a termination part formed of a metallic core coated by a layer of dielectric material, the termination part including:
       an internal bore extending through the termination part along a longitudinal axis from a proximal end of the termination part, positioned nearer the head of the fastener, to a distal end of the termination part, positioned opposite the proximal end, the internal bore including an inner wall extending from the distal end, a counterbore hole extending from the proximal end, and an annular cavity disposed between the inner wall and the counterbore hole; and
       an outer surface including an outer wall extending from the distal end, and a frustoconical wall positioned proximally relative to the outer wall, the frustoconical wall extending radially outwardly from the outer wall and having an included angle of less than approximately 90 degrees;

providing a seal disposed in the counterbore hole;

positioning the termination part over the fastener so that the inner wall of the internal bore of the termination part overlies the threaded portion of the fastener; and applying compressive force to the frustoconical wall formed in the outer surface of the termination part until the inner wall deforms radially inwardly to conform to and mechanically interlock with the threaded portion of the fastener.

14. The method of claim 13, further comprising, prior to positioning the termination part over the fastener, inserting a seal into a counterbore hole formed in the internal bore at the proximal end of the termination part, wherein applying compressive force further deforms the counterbore hole radially inwardly to compress the seal against the fastener and into a cavity of the internal bore located between the counterbore hole and the inner wall.

15. The method of claim 13, in which the frustoconical wall extends outwardly from an outer wall of the outer surface and defines an included angle of less than approximately 90 degrees.

16. The method of claim 13, in which the inner wall is cylindrical and sized to form a clearance fit with the threaded portion of the fastener, and in which positioning the termination part over the fastener comprises sliding the inner wall over the threaded portion.

17. The method of claim 13, in which applying compressive force comprises applying a swage tool to the outer surface.

18. The method of claim 13, in which the termination part has a body length from the proximal end to the distal end, and in which the outer wall of the outer surface has an outer wall length that is up to approximately 60% of the body length.

19. The method of claim 13, in which the core of the termination part is formed of a core material having an associated ultimate tensile strength, and in which the termination part is configured to deform at a compressive load of approximately 25-75% of the ultimate tensile strength.

20. The method of claim 13, further comprising, prior to positioning the termination part over the fastener, stacking a first structural member and a second structural member so that a first through hole of the first structural member is aligned with a second through hole of the second structural member, wherein a shank of the fastener extends through the first and second through holes.

* * * * *